US011365774B2

(12) United States Patent
Navruz et al.

(10) Patent No.: US 11,365,774 B2
(45) Date of Patent: Jun. 21, 2022

(54) BRAKE-SYSTEM DAMPING DEVICE

(71) Applicant: Robert Bosch GmbH, Stuttgart (DE)

(72) Inventors: Yakup Navruz, Heilbronn (DE); Edgar Kurz, Heilbronn-Horkheim (DE); Wolfgang Schuller, Cleebronn (DE); Holger Kurz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/250,325

(22) PCT Filed: May 11, 2019

(86) PCT No.: PCT/EP2019/062107
§ 371 (c)(1),
(2) Date: Jan. 5, 2021

(87) PCT Pub. No.: WO2020/011421
PCT Pub. Date: Jan. 16, 2020

(65) Prior Publication Data
US 2021/0269002 A1   Sep. 2, 2021

(30) Foreign Application Priority Data

Jul. 7, 2018   (DE) .................... 10 2018 211 246.0
Nov. 15, 2018   (DE) .................... 10 2018 219 605.2

(51) Int. Cl.
*B60T 17/00* (2006.01)
*F16D 65/00* (2006.01)
(Continued)

(52) U.S. Cl.
CPC ........ *F16D 65/0006* (2013.01); *B60T 8/4068* (2013.01); *B60T 13/581* (2013.01);
(Continued)

(58) Field of Classification Search
CPC ....... F16D 65/0006; F16L 55/04; B60T 17/04
See application file for complete search history.

(56) References Cited

U.S. PATENT DOCUMENTS 5,655,569 A * 8/1997 Tackett ................. B60T 8/4068
138/30
6,122,862 A * 9/2000 Hormann .............. E05D 15/246
49/197

(Continued)

FOREIGN PATENT DOCUMENTS

| DE | 199 48 444 A1 | 4/2001 |
| EP | 0 921 049 A2 | 6/1999 |
| EP | 2 105 363 A1 | 9/2009 |

OTHER PUBLICATIONS

International Search Report corresponding to PCT Application No. PCT/EP2019/062107, dated Sep. 6, 2019 (German and English language document) (5 pages).

*Primary Examiner* — Vishal R Sahni
(74) *Attorney, Agent, or Firm* — Maginot, Moore & Beck LLP

(57) ABSTRACT

A brake-system damping device includes a first chamber, to which hydraulic pressure is to be applied, a second chamber, in which there is a compressible medium, and a first separating element for separating the first chamber from the second chamber. The brake-system damping device includes a third chamber, in which there is a compressible medium, and a second separating element for separating the second chamber from the third chamber. The second chamber is connected, for medium conduction, to the third chamber by means of a passage formed in the second separating element. A closure element is to be moved with the first separating element, by means of which closure element the passage is to be closed as soon as the hydraulic pressure has reached predefined pressure value in the first chamber.

19 Claims, 5 Drawing Sheets

(51) Int. Cl.
  *B60T 13/58*  (2006.01)
  *F16F 9/04*  (2006.01)
  *F16L 55/033*  (2006.01)
  *B60T 8/40*  (2006.01)
  *F16L 55/053*  (2006.01)

(52) U.S. Cl.
  CPC ............ *B60T 17/00* (2013.01); *F16F 9/0454* (2013.01); *F16L 55/0338* (2013.01); *F16L 55/053* (2013.01)

(56) References Cited

U.S. PATENT DOCUMENTS

| | | | |
|---|---|---|---|
| 2014/0000740 A1* | 1/2014 | Wald | F16L 55/053 138/30 |
| 2017/0217416 A1* | 8/2017 | Yang | B60T 13/168 |
| 2020/0263746 A1* | 8/2020 | Ambrosi | F16L 55/0338 |
| 2020/0386291 A1* | 12/2020 | Kurz | F16L 55/053 |
| 2021/0018053 A1* | 1/2021 | Kurz | B60T 17/22 |
| 2021/0054890 A1* | 2/2021 | Kurz | F16L 55/053 |

* cited by examiner

BRAKE-SYSTEM DAMPING DEVICE

This application is a 35 U.S.C. § 371 National Stage Application of PCT/EP2019/062107, filed on May 11, 2019, which claims the benefit of priority to Serial No. DE 10 2018 211 246.0, filed on Jul. 7, 2018 in Germany, and which claims the benefit of priority to Serial No. DE 10 2018 219 605.2, filed on Nov. 15, 2018 in Germany, the disclosures of which are incorporated herein by reference in their entirety.

BACKGROUND

The disclosure relates to a brake system damping device having a first chamber, to which hydraulic pressure is to be applied, and a second chamber, in which a compressible medium is situated, and a first separating element for separating the first chamber from the second chamber.

Brake systems, in particular hydraulic brake systems, serve for decelerating a driving speed of vehicles, such as for instance passenger cars and trucks. During operation of such brake systems there occur various dynamic effects, inter alia pressure fluctuations in lines and chambers present therein that lead to oscillations or pulsations and as a result to undesired noises and vibrations. In order to minimize such oscillations or to achieve a damping action for these oscillations, brake system damping devices, also referred to as dampers hereinbelow, are installed at one or more installation sites in the brake system. These dampers comprise a first chamber, in which a hydraulic pressure is to be applied. The chamber is in principle a type of container. The pressure is in principle the result of a force acting on a surface. A force is transmitted hydraulically in the dampers, that is to say by way of a pressurized liquid.

There are known dampers having a separating element, which separates the chamber into a first chamber, in which a liquid or a fluid is situated, and into a second chamber, in which a compressible medium, as a rule in the form of a gas, is situated. The volume of a chamber of a deformable container in which a gas is situated decreases as is known when an increased pressure is exerted on this container from outside. Equally, the volume of the second chamber also decreases by means of the separating element when a hydraulic pressure prevails at the first chamber.

If this pressure reduces again, the volume of the gas and hence of the second chamber correspondingly increases again. The second chamber thus acts like a pneumatic spring, also referred to as gas spring. How soft or hard this gas spring damps is dependent on the gas volume of the second chamber. The larger the gas volume, the softer the damping.

During a braking operation, a vehicle driver depresses a brake pedal which thereby covers a distance known as pedal travel. This pedal travel is in direct relationship to the gas volume of the second chamber relevant here. The larger the gas volume, the longer is also the pedal travel. The positive effect of soft damping is thus contrasted by the negative effect of a large pedal travel length.

The object on which the disclosure is based is to provide a device for damping oscillations in a brake system with improved damping properties.

SUMMARY

According to the disclosure, a brake system damping device is created having a first chamber, to which hydraulic pressure is to be applied, and a second chamber, in which a compressible medium is situated, and a first separating element for separating the first chamber from the second chamber. The object is achieved according to the disclosure in that the brake system damping device has a third chamber, in which the compressible medium is likewise situated, and a second separating element for separating the second chamber from the third chamber. Here, the second chamber is connected to the third chamber in a medium-conducting manner by means of a passage configured in the second separating element. Moreover, a closure element is to be moved together with the first separating element and by means of which the passage is to be closed or is closed as soon as the hydraulic pressure has reached a predefined pressure value in the first chamber.

The third chamber, like the second chamber, thus contains the compressible medium which is preferably formed by a gas and particularly preferably by air. The second separating element separates the third chamber from the second chamber, although the two chambers initially remain connected by means of the medium-conducting passage. The passage or the connection is preferably configured by a simple bore and can be closed by means of the closure element of the first separating element. The closure element is preferably simply a surface region on the surface of the first separating element. This closure element closes the passage only when a sufficient hydraulic pressure for this purpose prevails in the first chamber. Specifically, the first separating element is deformed in particular starting from the predefined pressure value to such an extent that it then bears against the second separating element. The second separating element thus preferably forms a stop for the closure element.

On account of the closed passage, the third chamber is then decoupled from the second chamber and is thus no longer available for the remainder of the damper. For the further damping action above the predefined pressure value, there remains only the volume of the medium in the second chamber. This is now relatively small owing to the first separating element being deformed in the direction of the second separating element. The damper according to the disclosure thus has only a smaller elasticity and damping action, since the second chamber can barely still take up volume. However, the advantageous effect here is that now a pedal travel or the travel of a brake pedal of the brake system is no longer substantially lengthened during an actuation by means of a vehicle driver. Particularly advantageously, the first separating element bears, upon closure of the passage, even completely against the inner wall of the second chamber, including the side of the second separating element that faces the second chamber, with the result that the second chamber completely disappears or has no more volume. The pedal travel then no longer lengthens at all starting from the predefined pressure value. The thus likewise ceasing damping action is acceptable, since the relevant pressure range for the damping lies below the predefined pressure value.

The pressure value is thus preferably selected or predefined in such a way that it represents the upper limit value of a relevant pressure range for the damping. The respective volumes of the second and third chamber are preferably tailored here to the relevant pressure range and the desired elasticity or damping action of the damper. In this advantageous way, the damper combines the high elasticity of the large medium volume in the relevant pressure range for the damping with a limitation of the volume which can be taken up by the first chamber above this pressure range. In other words, there is no longer any direct dependency between the displaced volume of braking medium and the medium volume used for the damping. The damper thus offers excellent damping properties for a short pedal travel.

A further advantage of the disclosure is that the pressure in the closed-off third chamber is considerably lower than would be the pressure in the second chamber without a passage to a further chamber, that is to say in the prior art. Undesired effects are reduced as a result. On the one hand, the permeation through the first separating element is reduced at lower pressure and, on the other hand, the temperature of the medium at lower pressure is not so high, with the result that material aging of the first separating element is delayed.

It is possible by means of the specified technical advantages to considerably increase customer acceptance and market opportunities of vehicles which are equipped with the brake system damping device according to the disclosure.

In one advantageous development of the disclosure, the first separating element is formed in one piece with the closure element. In one piece means that two elements, here the first separating element and the closure element, are formed integrally or as one part. This has the advantage of simple assembly and inexpensive production.

In a second advantageous development of the disclosure, the first separating element is configured with a diaphragm, preferably with a rolling diaphragm. Diaphragms are to be understood here in principle as meaning sealing elements which, as elastic, movable separating walls or separating elements, hermetically separate two chambers from one another. Especially rolling diaphragms are provided here only for one-sided pressure loading in the direction of a loop inner side or diaphragm head depression. In response to changes in volume, rolling diaphragms offer only a negligibly small intrinsic stiffness or a small resistance to elastic deformation. By virtue of their design, rolling diaphragms are thus particularly well-suited as a separating element for the brake system damping device according to the disclosure.

In a third advantageous development of the disclosure, the first separating element is produced from an elastomer, preferably from ethylene-propylene-diene rubber. Elastomers are dimensionally stable, but elastically deformable plastics. These plastics can therefore deform under tensile and compressive loading, but then return to their original, nondeformed shape. Elastomers are thus particularly well-suited materials for separating elements within the meaning of this disclosure, such as for example for the above-described rolling diaphragm.

The elastomer has to maintain its elasticity and must neither swell nor shrink too much. It is therefore necessary for a suitable elastomer to be used for the medium to be sealed. Ethylene-propylene-diene rubber, also abbreviated to EPDM, is an elastomer resistant to braking medium and therefore particularly suitable for use in the brake system damping device according to the disclosure.

It is additionally advantageous according to the disclosure for the predefined pressure value to be predefined with a value between 0 and 30 bar, preferably between a range of 3 and 10 bar, and particularly preferably at 5 bar. If a brake system applies a pressure of approximately 60 bar to an associated wheel of a vehicle, this has the effect of securely blocking the wheel. However, for damping oscillations or pulsations in brake systems, only a considerably smaller, limited pressure range is relevant. When a pressure value of approximately 5 bar has been reached, the disturbing oscillation or pulsation is already sufficiently damped. The pressure value can therefore be particularly advantageously set to this value.

Furthermore, the passage is preferably formed by an open-pore material. A material is open-pore if it contains pores which prevent the ingress of liquids but allows the escape or penetration of gases. This can also be referred to as a breathable material. After application of the first separating element, the pores would be closed just like differently configured passages, such as for example bores. However, the advantage of the open-pore material lies in the fact that no liquid can enter the third chamber. The brake system would thus have additional protection against brake fluid escaping from the brake system, for example if the first separating element is damaged or nontight.

Moreover, a plurality of passages are preferably provided in the second separating element. During the braking operation, these passages ensure quicker redistribution of the medium from the second chamber into the third chamber. As a result, the elasticity of the entire medium volume can be better exploited.

In a further advantageous embodiment, the third chamber is subdivided into a plurality of subchambers which are each connected to the second chamber in a medium-conducting manner by means of a passage. The plurality of subchambers allow greater flexibility than when using only a single third chamber. The passages to the individual subchambers are thus preferably closed in succession by means of the first separating element, with the result that the damping action is reduced stepwise, and not completely and suddenly at the one predefined pressure value. In addition, closing passages and making them available again makes it possible for a variable number of subchambers and thus a variable medium volume to be used. This facilitates the tailoring of the damper to the relevant pressure range and the desired elasticity.

It is advantageous according to the disclosure for the third chamber to be formed by means of the second separating element and a cover. The cover is provided as a closure for a brake system having the brake system damping device according to the disclosure, and allows flexible access to the brake system. This makes it possible for the second separating element to be exchanged in a simple manner. Moreover, brake system damping devices which previously used only one chamber between the cover and an elastic separating element for damping can be retrofitted with the second separating element.

Building thereon, the second separating element is completely enclosed by the cover and the first separating element. As a result, the second and third chamber with the contained medium volume are additionally sealed. A complete enclosure of the second separating element additionally means that the combination of these three components does not outwardly differ from a combination only of cover and first separating element. As a result, the configuration of the second separating element is independent of the further brake system. Even a removal of the second separating element from the damper is thus possible, preferably if a larger medium volume is required.

Also advantageous are further embodiments which make the brake system damping device more efficient still or supplement it with alternative embodiments.

For instance, the compressible medium which is contained in the second and third chamber is preferably formed as a gas, and particularly preferably as air. Air is easily available, can be used and compressed without costs, and is thus extremely suitable for use in the brake system damping device according to the disclosure.

The medium volume or the second and third chamber are alternatively and additionally produced or created by means of a combination of a plurality of turned, cold-formed or deep-drawn parts. Turned parts are components having a circular cross section, cold-formed parts are closure components, and deep-drawn parts are body components of vehicles. All these components are thus easy to create in the automotive industry and are given a new usage purpose by means of the disclosure.

Moreover, the brake system damping device is preferably provided for use in driving dynamics regulating systems and/or power-assisted brake systems. A driving dynamics regulating system or electronic stability program, also referred to as ESP, is an electronically controlled driver assistance system for a motor vehicle, which counteracts skidding of the motor vehicle through targeted braking of individual wheels. A power-assisted brake system or a power-assisted brake installation is operated by means of externally generated force. For example, an electrohydraulically actuated brake is a power-assisted brake in which the actuation energy originates from a hydraulic pressure accumulator which is charged by a pump.

In one advantageous embodiment, the brake system damping device has a rib structure, in particular with a structure end side and at least one structure rib, which supports the second separating element and traverses the third chamber. Here, the rib structure is preferably arranged on the second separating element on the side facing away from the first separating element or the side having the separating element outer wall in order to support the second separating element against a pressure acting on the separating element inner wall. The separating element outer wall thus forms a first end side of the rib structure. The opposite or second end side of the rib structure is formed by the structure end side which is preferably of planar configuration. The structure rib is a load-bearing element of the supporting rib structure and extends from the separating element outer wall up to the structure end side. By virtue of the supporting function of the rib structure, the brake system damping device is intrinsically more stable. Moreover, the material of the second separating element is less stressed, which has a positive effect on its service life.

The rib structure is preferably configured with two or more structure ribs in order to give the rib structure further stability. In addition, the rib structure is advantageously formed with a perpendicular circular hollow cylinder which starts centrally on the separating element outer wall and extends departing therefrom up to the second end of the rib structure or the structure end side. A cylinder cavity formed in the circular hollow cylinder is here preferably connected to the passage in the second separating element in a medium-conducting manner. It should be explicitly pointed out at this juncture that the passage in the second separating element must in no case be closed by the rib structure.

The structure ribs start on the outside of the circular hollow cylinder and at these points—referred to as starting points hereinbelow—have an extent or rib depth which corresponds to the length of the circular hollow cylinder. From these starting points, the structure ribs preferably extend radially or in the form of rays away from the circular hollow cylinder, with the result that a star-shaped structure arises. Here, the rib depth of each structure rib varies to correspond to the shape of the adjacent end sides of the rib structure. As already mentioned, the structure end side is preferably planar and thus causes no variation in the rib depth. By contrast, the separating element outer wall is mostly uneven or of three-dimensional configuration. The respective rib depth must then vary or be configured to correspond to the separating element outer wall. The stability of the rib structure is further improved as a result.

The rib structure preferably forms at least two structure subchambers which are connected to one another in a medium-conducting manner by means of at least one connecting duct. Here, the structure subchambers are each formed by means of at least one structure rib, the separating element outer wall, and a further component surrounding the third chamber. This component is, as already mentioned above, preferably the cover. The structure subchambers are preferably arranged here in such a way that a supporting rib structure arises or the supporting effect of the rib structure is further strengthened. The connecting duct is an opening in an element, preferably a structure rib, which separates the two structure chambers from one another. In this way, the compressible medium passes from the second chamber into each of the structure subchambers of the divided third chamber and thus develops maximum damping for the brake system damping device. In addition, however, it is also possible to set a lower degree of damping by means of partitioning individual structure subchambers or closing individual connecting ducts, if desired.

If the rib structure is configured with the circular hollow cylinder, as described above for an advantageous embodiment, a connecting duct preferably leads from this cylinder cavity to each of the structure subchambers. It is possible in this way to achieve uniform propagation of the medium, and thus equal-intensity loading of all regions of the rib structure.

As already mentioned above, the compressible medium is preferably formed as a gas, and particularly preferably as air. Therefore, the third chamber will also be referred to below as second air chamber, the structure subchambers will also be referred to below as air subchambers, and the medium volume will also be referred to below as air volume. Accordingly, the second air chamber has been replaced by a plurality of connected air subchambers which take up an air volume, with a desired graduated damping of the brake system damping device being able to be set by means of the air subchambers. In other words, the proposed construction offers design possibilities for connecting the air chambers by means of the connecting ducts.

Moreover, the second separating element is provided not only for separating the second chamber from the third chamber or from the second air chamber, but preferably also performs a holding or carrying function for the first separating element. The first separating element is, as already mentioned above, advantageously configured with a diaphragm. Therefore, the second separating element will also be referred to below as a diaphragm carrier component. The rib structure described gives rise to an intrinsically stable diaphragm carrier component which additionally offers a plurality of design possibilities for the third chamber or the division thereof. In addition, the described configuration of the diaphragm carrier component allows the use of cost-effective mold-based components which can be produced for example by means of technologies such as injection-molding.

In a further advantageous embodiment, the rib structure has a rib casing which surrounds the rib structure and is configured in particular with a casing outer wall and a casing inner wall. The rib casing is a type of hollow cylinder which encloses the rib structure and extends from the separating element outer wall up to the structure end side. The casing outer wall bears here against the component surrounding the third chamber. The casing inner wall forms a surface up to which the structure ribs extend. By way of the rib casing, the rib structure is configured to be more compact and even more stable.

The rib structure and the rib casing are preferably configured in one piece, preferably in one piece with the second separating element. In one piece means, as already mentioned, that a plurality of elements, here the rib structure with the rib casing, and preferably also with the second separating element, are formed integrally or as one part. The advantage lies here in simple assembly and inexpensive production.

It is additionally advantageous according to the disclosure for the rib casing to be configured with at least one casing slot, wherein the casing slot is preferably arranged to extend from the structure end side in the direction of the separating element outer wall and is provided to open the rib casing toward one of the structure subchambers. The casing slots thus form cutouts in the otherwise completely closed rib casing. The volume that can be taken up by the compressible medium is increased by means of these cutouts or clearances, with the result that the degree of damping of the brake system damping device is increased. Moreover, material is saved.

Furthermore, the rib casing is preferably configured with at least one latching element, wherein the latching element preferably protrudes from the casing outer wall and is preferably arranged on the structure end side. The latching element is a protuberance or hook which is provided to latch into a recess within the component surrounding the casing outer wall. The latching element thus offers the possibility of anchoring the second separating element in the third chamber. The brake system damping device thus gains additional stability.

Building thereon, the latching element is arranged adjacent to two casing slots. The two casing slots each run directly along the latching element, with the result that a carrier device for the latching element is formed that is flexible or can be pressed in. The second separating element can thus be more easily mounted or guided to a latching-in point. Particularly when the second separating element is produced from a material which can be deformed only with great difficulty, the mounting thereof is considerably facilitated by means of the carrier device formed.

According to the disclosure, the brake system damping device advantageously has a rib casing-encompassing component with a component inner wall, in which component the inner wall is configured with a depression running around the casing outer wall, wherein the depression is provided for latching in the latching element. The component is preferably the cover or the housing of the brake system damping device. The component inner wall, or a surface of the component that bears against the rib casing or its casing outer wall, forms, together with the latching hooks arranged on the casing outer wall, a form-fitted connection between the second separating element or diaphragm carrier component and the surrounding component, preferably the cover. The depression is preferably the above-described recess. Since the depression is configured to run around in the surrounding component but, on the other hand, the at least one latching element is configured individually, this form-fitting connection is flexible and, with respect to the latching element, position-independent.

Moreover, the structure end side is arranged so as to bear against the component inner wall in order to be supported thereon. The bearing against the component inner wall increases the supporting effect of the rib structure and considerably reduces the surface pressure on the component inner wall, preferably the cover. As a result, softer and/or more cost-effective materials can also be used for the diaphragm carrier component or the second separating element instead of very solid materials, such as preferably those consisting of machined metal. Favorable mold-based components can thus also be used as diaphragm carrier component.

In one advantageous embodiment, the second separating element is produced by means of injection-molding, preferably by means of powder injection-molding and particularly preferably by means of metal powder injection-molding. Injection-molding, also referred to as diecasting or diecasting method, is a production method, more precisely a primary forming method for producing components. Here, an injection-molding machine is used to liquify the respective material and inject it under pressure into a mold. Powder injection-molding, or PIM method, is a primary forming method for producing components from metal or ceramic. Therefore, metal powder injection-molding, or MIM method, is a primary forming method for the production especially of metallic components. It is possible by means of these technologies for the second separating element or the diaphragm carrier component to be produced very simply and cost-effectively as a mold-based component.

In one advantageous development of the disclosure, the brake system damping device has a fourth chamber which is arranged so as to surround the rib casing of the second separating element in order to additionally provide damping volume. The fourth chamber is realized by configuring the component surrounding the rib casing, preferably the cover, to be smaller or shorter. The fourth chamber thus forms a further decouplable chamber for additional uptake of medium volume, preferably air volume, without increasing the space requirement within the brake system damping device. The larger the available volume, the more the brake system damping device is elastic and thus effective in terms of pulsation reduction or damping. This proposed solution therefore opens up a possibility for function optimization without additional effort and cost.

In addition, the second separating element is configured with a support ring which encloses the rib casing and which has a ring outer edge, wherein the support ring is arranged so as to project into the fourth chamber and to bear against the first separating element. Here, the support ring bears fixedly against the casing outer wall of the ring casing and extends radially therefrom, preferably as far as is maximally allowed by the size of the fourth chamber. The ring outer edge outwardly delimits the support ring and preferably bears against an inner wall of the fourth chamber. With the bearing arrangement of the support ring against the first separating element, preferably a diaphragm, the fourth chamber is delimited in the direction of the first separating element, and the first separating element is thereby supported or stabilized. This also contributes to the stability of the overall brake system damping device. In addition, the second separating element or diaphragm carrier component then forms a support surface for an outer peripheral sealing region of the first separating element, preferably of the diaphragm.

Furthermore, the second separating element is preferably configured in one piece with the support ring. Configured in one piece means, as already mentioned above, that two elements are formed integrally or as one part, with the advantage of simple assembly and inexpensive production.

In a further advantageous development of the disclosure, the support ring has arranged thereon at least one ring rib which supports the support ring. The ring rib is thus a load-bearing or supporting element which is preferably arranged so as to bear not only against the support ring but also against the casing outer wall of the ring casing and/or against the inner wall of the fourth chamber. The support ring is additionally stabilized as a result.

Building thereon, the support ring preferably has two or more ring ribs arranged thereon by which the fourth chamber is divided into at least two ring subchambers. Here, the ring subchambers are advantageously each formed by means of two ring ribs, the inner wall of the fourth chamber, the casing outer wall of the ring casing and the support ring. Here, the ring subchambers can be referred to as chambers which for their outer radial delimitation utilize a nonmodified interface bore in a component, preferably the housing, surrounding the fourth chamber. This novel configuration of the second separating element thus forms additional ring subchambers, preferably air chambers at its circumference that can be utilized for the further boosting and settability of the damping.

In a further embodiment, the ring ribs on the casing outer wall are each arranged opposite a structure rib on the casing inner wall. This arrangement, in which the ring ribs form a type of extension of the structure ribs, affords additional stability of the second separating element and moreover simplifies the production thereof.

The casing slots are preferably arranged in such a way that they connect the third chamber to the fourth chamber in a medium-conducting manner. By means of this arrangement, the casing slots act as connecting ducts between the structure subchambers in the third chamber and the ring subchambers in the fourth chamber. In other words, the volume of individual surrounding chambers is coupled to the internal volume, preferably air volume, of the rib structure by means of longitudinal slots, which incidentally are formed at the latching elements, preferably latching hooks. In this way, the compressible medium passes from the structure subchambers into the ring subchambers and thus develops the maximum damping for the brake system damping device. Moreover, however, it is also possible here for a lower degree of damping to be set, if desired, by means of partitioning individual ring subchambers or closing individual casing slots.

According to the disclosure, it is advantageous for the at least one ring rib to be arranged so as to extend from the casing outer wall as far as the ring outer edge of the support ring. This arrangement effectively utilizes the fourth chamber, gives the support ring a very high degree of stability and allows sealing between the ring subchambers.

In a further advantageous development of the disclosure, the component encompassing the rib casing has a component outer wall, wherein the component outer wall bears in a sealing manner against the housing inner wall. The component encompassing the rib casing is, as already mentioned above, preferably the cover. In such a preferred embodiment, the tightness of the brake system damping device to the outside is formed between the housing and the cover. The tightness of the brake system damping device is thus ensured in a particularly sustainable manner since none of the components which are stressed during braking operations, such as the first or second separating element, have to contribute to the tightness.

It is particularly advantageous for the component encompassing the rib casing, preferably the cover, to be configured and arranged in such a way that the ring ribs of the second separating element are latched or snapped in the cover. As a result, the component is additionally fastened or secured in the brake system damping device. Moreover, the ring subchambers are better sealed in relation to one another in this way.

Moreover, the housing inner wall preferably bears in a sealing manner against the component outer wall by virtue of the component encompassing the rib casing being inserted into the housing by means of pressing in.

Pressing in is a method in which the parts to be connected are substantially only elastically deformed upon being joined together and unintentional release is prevented as a result of a force-fitting connection. Force-fitting connections require a normal force on the surfaces to be connected to one another. Mutual displacement thereof is prevented as long as the counterforce produced by the static friction is not exceeded.

The pressing-in operation preferably occurs by means of a press-in fastener. It would therefore be necessary for the component encompassing the rib casing, preferably the cover, to be configured as a press-in fastener. The pressing in of a press-in fastener is also referred to as a self-clinching technique. Press-in fasteners or self-clinching fasteners are self-clamping or self-locking fastening elements which, without welding or additional fasteners, can be attached to metal sheets, substrates or openings in ductile or deformable material.

In a further advantageous development of the disclosure, the diaphragm holding device of the second separating element is configured to be outwardly expanded in the form of a bead and/or trumpet. As a result, the first separating element is fixed firmer and tighter on the housing inner wall. In addition, a movement of the closure element and of the diaphragm fold is better guided in the direction of the second separating element, and better form-fitting bearing of the first separating element against the separating element inner wall of the second separating element is promoted.

BRIEF DESCRIPTION OF THE DRAWINGS

Exemplary embodiments of the solution according to the disclosure will be explained in more detail below on the basis of the appended schematic drawings, in which.

DETAILED DESCRIPTION

Figure 1:
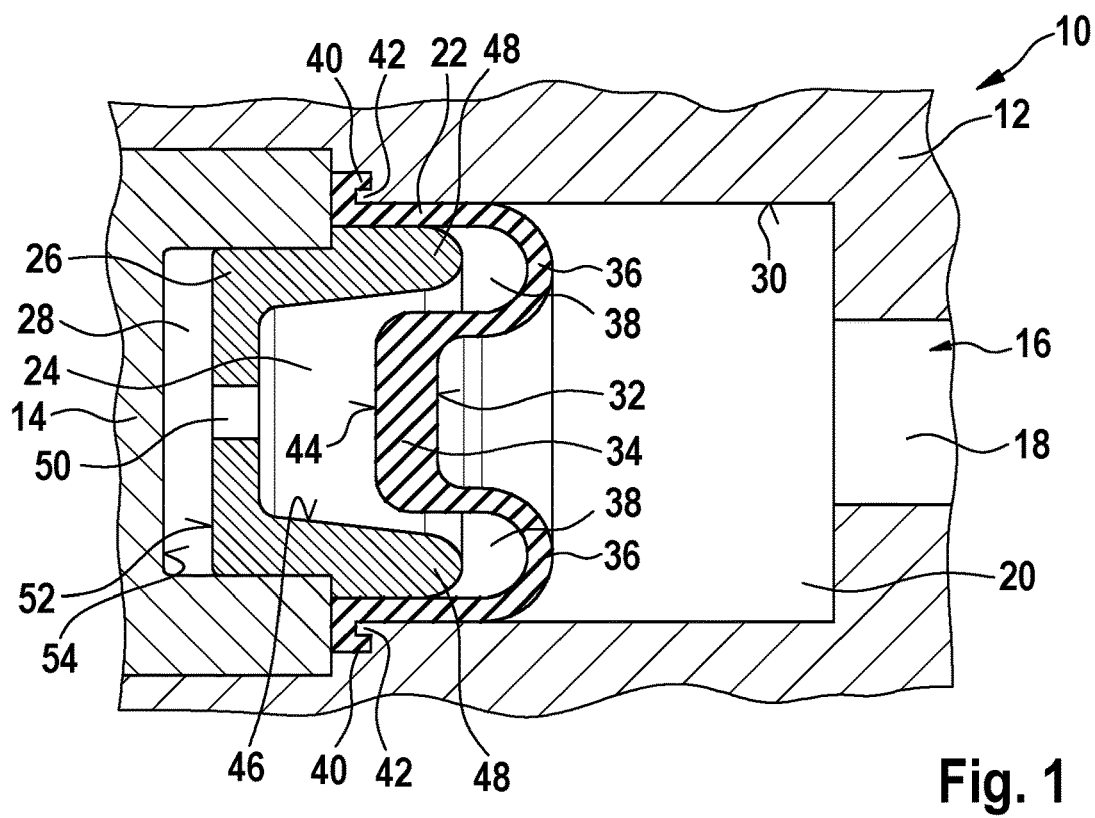
FIG. 1 shows a first exemplary embodiment of a brake system damping device according to the disclosure.

FIG. 1 illustrates a brake system damping device 10 having a housing 12 and a cover 14. In the housing 12 there is arranged a supply line 16 in which there presently prevails no hydraulic pressure, illustrated by means of a scratched arrow 18. The supply line 16 opens into a first chamber 20, which is adjoined by a first separating element 22, here a rolling diaphragm. Behind the first separating element 22 as viewed from the first chamber 20 there is situated a second chamber 24 which is adjoined by a second separating element 26, with a third chamber 28 being situated behind the second separating element 26 in the viewing direction.

In detail, these chambers 20, 24, 28 and separating elements 22, 26 appear as follows. The first chamber 20 is surrounded by a housing inner wall 30 and a first separating element inner wall 32 of the first separating element 22, referred to hereinbelow as rolling diaphragm. Arranged centrally in the separating element 22 and formed in one piece therewith is a closure element 34 from which the separating element 22 extends further outward toward a diaphragm fold 36. A diaphragm fold depression 38 is situated within the diaphragm fold 36 or surrounded thereby. Adjoining the diaphragm fold 36, the separating element 22 extends up to a diaphragm collar 40 which engages around a coupling mount 42 of the housing 12. The separating element 22 configured as a rolling diaphragm has part of its separating element inner wall 32 bearing in a sealing manner against the housing inner wall 30 and has a first separating element outer wall 44 facing the second chamber 24. The second chamber 24 is surrounded by the first separating element outer wall 44 and a second separating element inner wall 46 of the second separating element 26.

The second separating element 26 has a diaphragm holding device 48 extending into the diaphragm fold depression 38. Arranged centrally in the second separating element 26 is a passage 50 which connects the second chamber 24 to the third chamber 28. Here, the passage 50 leads through the second separating element inner wall 46, the second separating element 26 and a second separating element outer wall 52. The third chamber 28 is surrounded by the second separating element outer wall 52 and a cover inner wall 54 of the cover 14.

In the illustrated starting state of the brake system damping device 10 there is initially no hydraulic pressure prevailing in the first chamber 20 in which a braking medium is situated. The separating element 22, which is produced from an elastomer, is situated here substantially in its basic form. Here, it bears against the housing inner wall 30 in such a way that the first chamber 20 is hermetically sealed in relation to the second chamber 24, with a gas, here especially air, being situated in the second chamber 24. This gas is also situated in the third chamber 28, which is connected to the second chamber 24 by means of the passage 50. These two chambers 24, 28 thus form a common gas volume which is available for damping. By virtue of the greater elasticity of this gas volume, a better damping action is achieved when braking or when applying a hydraulic pressure to the first chamber 20.

When a hydraulic pressure prevails in the first chamber 20, the separating element 22 deforms in such a way that the gas volume in the second chamber 24 decreases. Here, the closure element 34 moves into the second chamber 24. Starting from a specific hydraulic pressure which is fixed above a relevant pressure range for damping, the closure element 34 bears against the second separating element inner wall 46 of the second separating element 26 and closes the passage 50 to the third chamber 28. Here, the second separating element 26 acts like a stop. States of the brake system damping device 10 in which the separating element 22 or its closure element 34 bears against the second separating element 26 and closes the passage 50 are illustrated in FIG. 2 and FIG. 3.

By virtue of the closed passage 50, the third chamber 28 is now separated from the second chamber 24, as a result of which only the remaining gas volume in the second chamber 24 can be used for the further damping. The elasticity and damping action is only minor, since the second chamber 24 can barely take up any more volume. This action is intentional, since the travel of a brake pedal connected to the brake system is thus also no longer substantially lengthened. In the state of the brake system damping device 10 as illustrated in FIG. 3, the separating element 22 and the second separating element 26 bear against one another without a gap or with full-surface contact, with the result that the second chamber 24 completely disappears or no longer has any volume. In this case, the travel of the brake pedal no longer lengthens.

As soon as the hydraulic pressure prevailing in the first chamber 20 decreases, the separating element 22 moves back into its starting state or its starting position.

Figure 2:
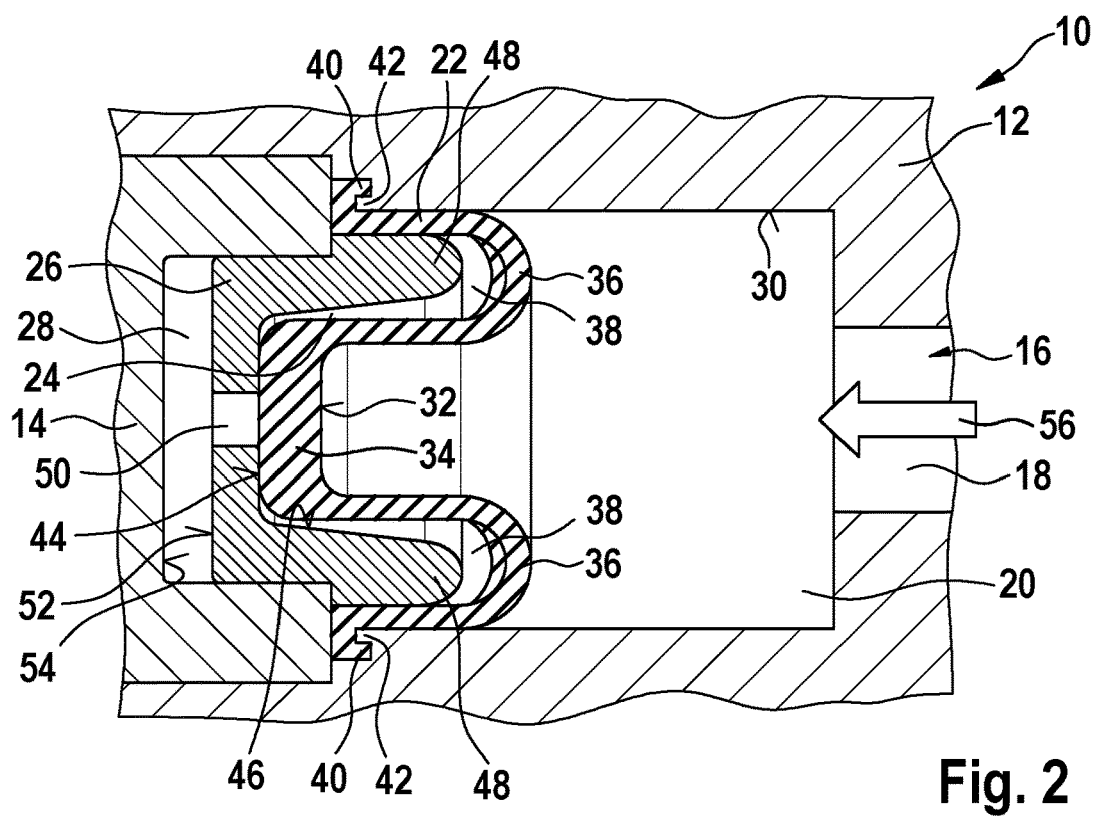
FIG. 2 shows the brake system damping device in FIG. 1 at a first applied hydraulic pressure.
Figure 3:
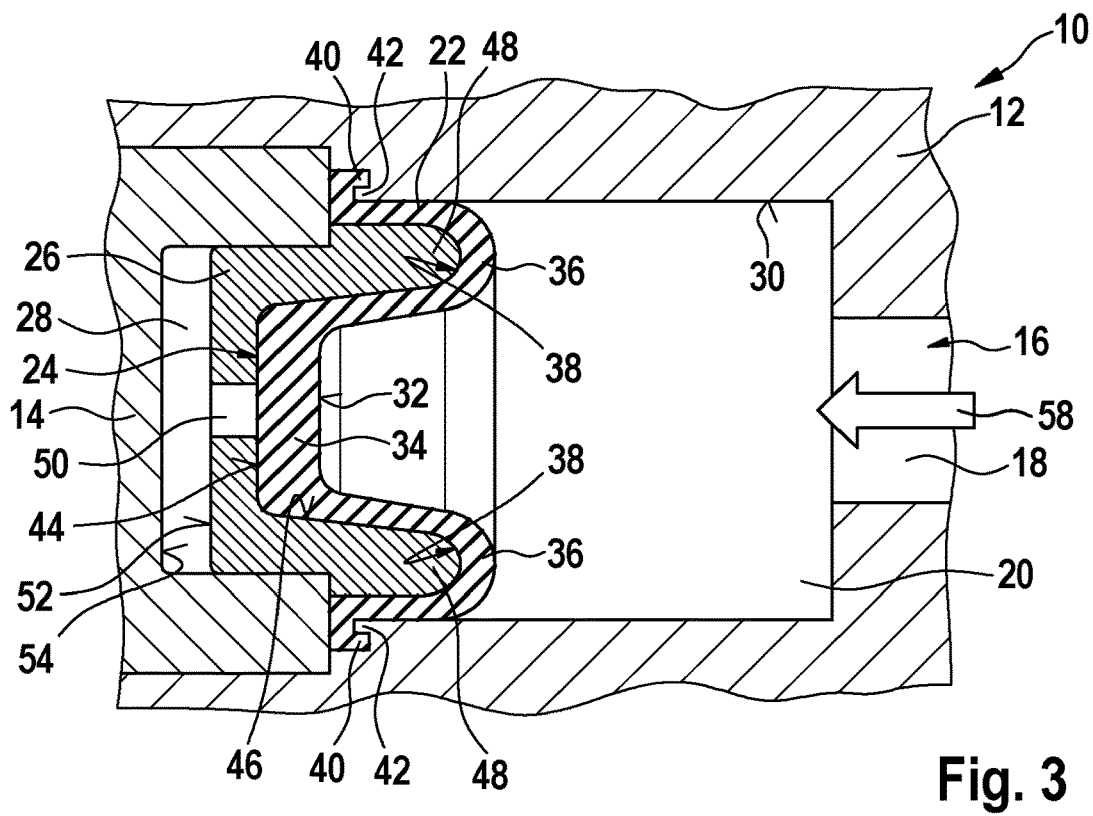
FIG. 3 shows the brake system damping device in FIG. 1 at a second applied hydraulic pressure.

FIG. 2 shows the brake system damping device 10 from FIG. 1, but in a state in which a first hydraulic pressure prevails at the first chamber 20, illustrated by means of an arrow 56 in the region of the supply line 16.

As already mentioned, the closure element 34 bears here against the second separating element inner wall 46 of the second separating element 26 and closes the passage 50 to the third chamber 28. Only the remaining volume in the second chamber 24 can thus be used for the further damping. In the illustration of FIG. 2, this volume is mainly the region around the diaphragm holding device 48. The effects on the damping and the braking operation have already been comprehensively stated in the description pertaining to FIG. 1 and will therefore not be described again here.

FIG. 3 illustrates the brake system damping device 10 from FIG. 1, but in a state in which a second hydraulic pressure prevails at the first chamber 20, illustrated by means of an arrow 58 in the region of the supply line 16.

As already mentioned, the closure element 34 bears against the second separating element inner wall 46 of the second separating element 26 and closes the passage 50 to the third chamber 28. Moreover, the separating element 22 and the second separating element 26 bear against one another without a gap, with the result that the second chamber 24 no longer has any volume. The effects associated therewith on the damping and the braking operation have already been comprehensively stated in the description pertaining to FIG. 1 and will therefore not be described again here.

Figure 4:
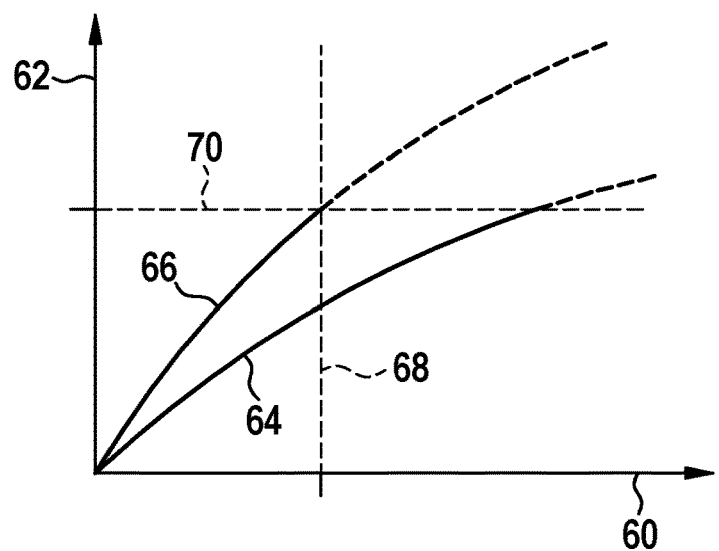
FIG. 4 shows a diagram with characteristic curves relating to the dependency of pressure and volume uptake in brake system damping devices.

FIG. 4 shows a diagram relating to the dependency between a pressure 60 and a volume uptake 62 in such brake system damping devices. Here, the pressure 60 is depicted on the x axis and the volume uptake 62 on the y axis. Extending from a coordinate origin of the diagram is a first characteristic curve 64 and a second characteristic curve 66. In addition, the diagram shows a vertical dashed line 68 which intersects the x axis and a horizontal dashed line 70 which intersects the y axis.

The first characteristic curve 64 shows the dependency between pressure and volume uptake for a brake system damping device having a small volume of medium available for the damping. For simplification, the volume of the second chamber 24 in FIG. 1 is to be assumed here for this characteristic curve 64.

The second characteristic curve 66, which extends above the first characteristic curve 64, shows the dependency of pressure and volume uptake for a brake system damping device having in relation thereto a comparatively large volume of medium available for the damping. For simplification, the summed volume of the second and third chamber 24, 28 in FIG. 1 is assumed here for the characteristic curve 66.

The vertical dashed line which intersects the x axis represents a predefined pressure value 68 which forms the upper limit of a pressure range which is relevant for the pulsation damping in such brake systems. This relevant pressure range thus extends from the coordinate origin up to the dashed line.

The horizontal dashed line which intersects the y axis represents a volume stop 70 for the brake system damping device 10 according to the disclosure. This volume stop lies approximately at the volume of the second chamber 24 in FIG. 1.

Corresponding configuration of the respective volumes of the second and third chambers 24, 28 allows the brake system damping device 10 to be tailored to the relevant pressure range and the desired elasticity or damping action in this pressure range. In the case of optimum tailoring, as illustrated in the diagram of FIG. 4, the dashed lines 68, 70 intersect with the characteristic curve 66 at a point.

Figure 5:
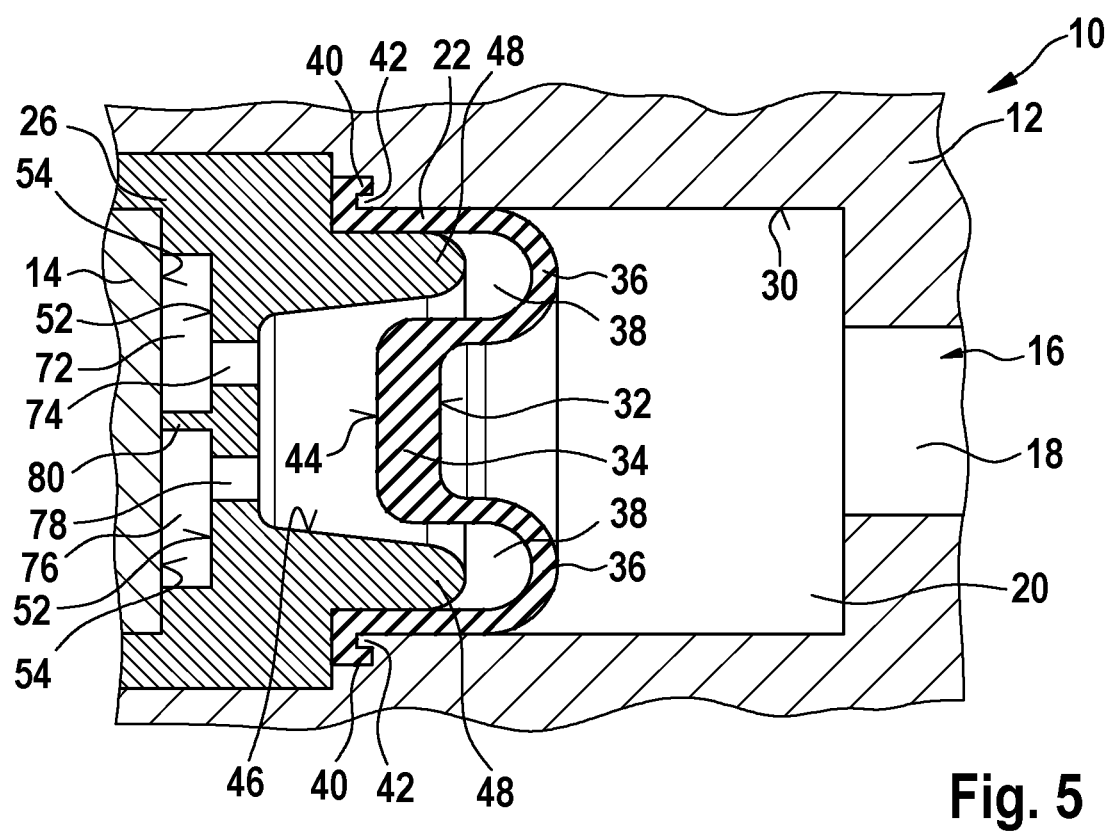
FIG. 5 shows a second exemplary embodiment of a brake system damping device according to the disclosure.

FIG. 5 illustrates a brake system damping device 10 which differs from the one in FIG. 1 only in the region which is faced by the first separating element outer wall 44 of the first separating element 22 configured as a rolling diaphragm. The separating element 22 itself and the region which is faced by the first separating element inner wall 32 of the separating element 22 completely correspond to FIG. 1 and will not be described again here.

The main difference over the brake system damping device 10 in FIG. 1 is that, instead of the third chamber 28 and the associated passage 50 in FIG. 1, the brake system damping device 10 here in FIG. 5 has a first subchamber 72 with a passage 74 and a second subchamber 76 with a second passage 78. Here, the two subchambers 72, 76 are separated by means of a separating wall 80. A further difference over FIG. 1 is that here in FIG. 5 the second separating element 26 extends up to the housing inner wall 30 and separates the cover 14 therefrom.

All further features correspond to those in FIG. 1. For instance, the second chamber 24 is also surrounded here by the first separating element outer wall 44 and a second separating element inner wall 46 of the second separating element 26. Likewise, the second separating element 26 extends here by way of a diaphragm holding device 48 into the diaphragm fold depression 38 of the separating element 22. Moreover, the subchambers 72, 76 aside from the separating wall 80 are, like the third chamber 28 in FIG. 1, surrounded by the second separating element outer wall 52 and a cover inner wall 54 of the cover 14.

The mode of operation is similar here to that in the brake system damping device 10 in FIG. 1. When a hydraulic pressure prevails in the first chamber 20, the separating element 22 also deforms here in such a way that the gas volume in the second chamber 24 decreases. Here, the closure element 34 moves into the second chamber 24 and, starting from a specific hydraulic pressure which ideally corresponds to the upper limit of the relevant pressure range, bears against the second separating element 26 and closes the passages 74, 78 to the subchambers 72, 76.

As soon as the hydraulic pressure prevailing in the first chamber 20 reduces, the separating element 22 configured as a rolling diaphragm moves back into its starting state or its starting position. As a result, the passages 74, 78 are then opened again, and the subchambers 72, 76 are connected again to the second chamber 24.

Figure 6:
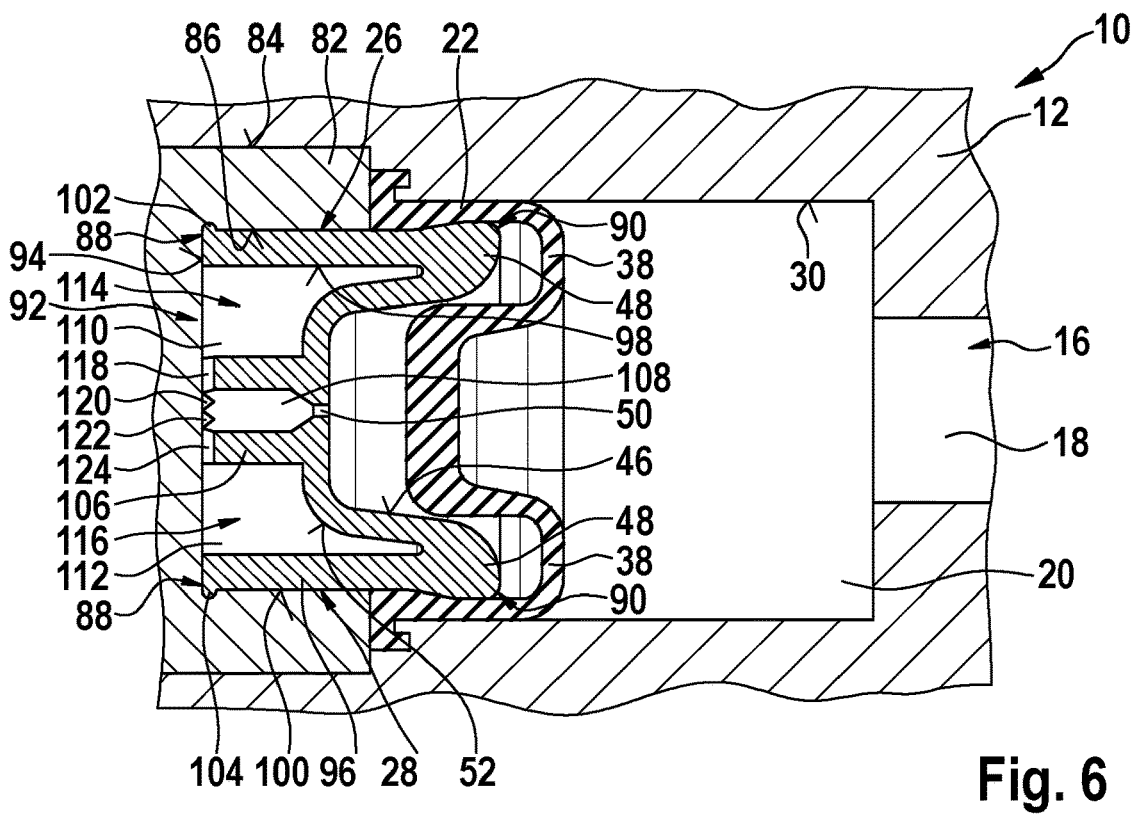
FIG. 6 shows a third exemplary embodiment of a brake system damping device according to the disclosure.

FIG. 6 shows a brake system damping device 10 which differs from that in FIG. 1 in the replacement of the cover 14 and in particular in the configuration of the second separating element 26. The remaining components in FIG. 6 correspond to those in FIG. 1 and will not be described again here apart from only this much: in the illustrated state of the brake system damping device 10, no hydraulic pressure 18 at the first chamber 20 prevails at the supply line 16, with the result that the first separating element 22 is situated in a normal shape or starting shape as in FIG. 1. The cover 14 in FIG. 1 is replaced in FIG. 6 by a component 82 having a component outer wall 84 and a component inner wall 86. This component 82 can likewise be used here as a cover. Here, the component 82 bears against the first separating element 22 in such a way that the second separating element 26 is completely enclosed by the component 82 and the first separating element 22. The component inner wall 86 has a depression 88 which runs around the second separating element 26 and which is here arranged at a maximum distance from the first separating element 22. The component outer wall 84 bears against the housing 12 or its housing inner wall 30.

On the side of the separating element inner wall 46, the second separating element 26 is configured substantially in exactly the same way as in the second separating element 26 in FIG. 1. The difference here lies only in that the diaphragm holding device 48 is configured within the diaphragm fold depression 38 to be expanded outwardly in the form of a trumpet or bead or in the direction of the housing inner wall 30, this configuration being referred to here as an outer convexity 90. On the side of the separating element outer wall 52, the second separating element 26 has a rib structure 92 which extends from the separating element outer wall 52 up to a structure end side 94 and thus traverses the entire third chamber 28. The rib structure 92 is configured in one piece with the second separating element 26 and is moreover surrounded by a rib casing 96 having a casing inner wall 98 and a casing outer wall 100. The rib casing 96 extends from the separating element outer wall 52, to be more precise from the diaphragm holding device 48 up to the structure end side 94. On the casing outer wall 100, adjacent to the structure end side 94, there are arranged a plurality of latching elements, with only the latching elements 102 and 104 being visible here, the latching elements being arranged latched in the depression 88.

Within the center of the rib structure 92 there is arranged a circular hollow cylinder 106 with a cylinder cavity 108, which starts at the separating element outer wall 52 in such a way that the passage 50 leads to the cylinder cavity 108. Extending from the circular hollow cylinder 106 up to the rib casing 96 or its casing inner wall 98 are a plurality of structure ribs, of which only the structure ribs 110 and 112 are visible here. The structure ribs 110, 112 divide the third chamber 28 within the ring casing 96 into a plurality of structure subchambers, of which only the structure subchambers 114 and 116 are visible here. The structure chambers are connected to the cylinder cavity 108 by means of connecting ducts, of which only the connecting ducts 118, 120, 122 and 124 are visible here. In this regard, the connecting ducts 118, 120, 122, 124 are arranged at the structure end side 94.

The brake system damping device 10 illustrated here is comparable in its basic mode of operation to the brake system damping device 10 in FIG. 1. It is also the case here for example that the component 82, like the cover 14 in FIG. 1, bears in a stabilizing manner against the first separating element 22. What is additionally presented in this brake system damping device 10 illustrated in FIG. 6 is the supporting function of the rib structure 92, which additionally allows graduated setting of the degree of damping, and the latch-in anchoring of the second separating element 26 in the component 82, here configured as a cover. The supporting effect is achieved by virtue of all the components of the rib structure 92 extending from the separating element outer wall 52 up to the structure end side 94, with the structure end side bearing against the component inner wall 86. The setting of the degree of damping can be carried out by means of closing one or more of the connecting ducts 118, 120, 122, 124 leading to the structure subchambers 114, 116. The latch-in anchoring in the component 82 occurs by means of the latching elements 102, 104. When the second separating element 26 is inserted into the component 82, or when the component 82 is pushed onto the second separating element 26, the latching elements 102, 104 are pressed in inwardly, that is to say into the rib casing 96. As soon as the structure end side 94 has reached the component inner wall 86, the latching elements 102, 104 latch into the depression 88 provided therefor in the component 82.

Figure 7:
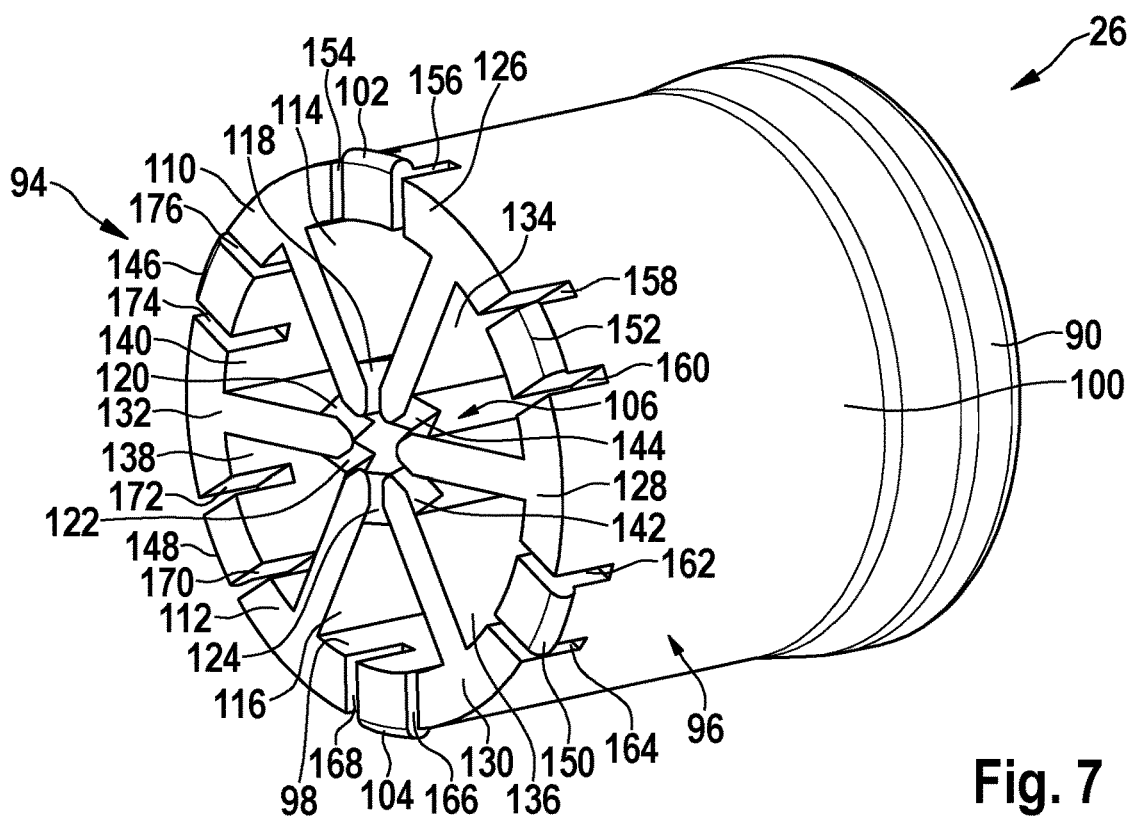
FIG. 7 shows the detail VII from FIG. 6.

FIG. 7 illustrates the second separating element 26 from FIG. 6 in perspective as viewed toward the structure end side 94. The rib structure 92 is therefore particularly clearly visible. Also more clearly evident here are the outer convexity 90 and the casing outer wall 100. Apart from the structure ribs 110 and 112 there are now also illustrated the further structure ribs 126, 128, 130 and 132 which extend from the circular hollow cylinder 106 up to the rib casing 96 or its casing inner wall 98. The structure subchambers 114, 116, 134, 136, 138, 140 are arranged between the structure ribs 110, 112, 126, 128, 130, 132 and connected to the cylinder cavity 108 by means of the connecting ducts 118, 120, 122, 124, 142, 144. On the casing outer wall 100 and at the structure end side 94 there are now also illustrated, in addition to the latching elements 102 and 104, the further latching elements 146, 148, 150, 152. Each of these latching elements 102, 104, 146, 148, 150, 152 is arranged adjacent to two of a plurality of casing slots 154, 156, 158, 160, 162, 164, 166, 168, 170, 172, 174, 176, with the casing slots 154, 156, 158, 160, 162, 164, 166, 168, 170, 172, 174, 176 extending from the structure end side 94 in the direction of the outer convexity 90.

The components which are newly illustrated here and which match those illustrated in FIG. 6 in terms of nomenclature, such as for example the further latching elements 146, 148, 150, 152, also have the same function. For that reason, such components will not be explained again in terms of their function. Completely newly visible, and therefore not yet described in terms of their functionality, are the casing slots 154, 156, 158, 160, 162, 164, 166, 168, 170, 172, 174, 176. They fulfill not only the purpose of making additional volume of the third chamber 28 available. In particular, as viewed from the structure end side 94, the casing slots 154, 156, 158, 160, 162, 164, 166, 168, 170, 172, 174, 176 divide up the rib casing 96 in such a way that the latching elements 102, 104, 146, 148, 150, 152 are separated. Depending on the flexibility of the material of the second separating element 26, the regions of the rib casing 96 at which one of the latching elements 102, 104, 146, 148, 150, 152 is arranged can be pressed inwardly with greater or lesser ease. This substantially facilitates the assembly of the second separating element 26 and/or of the component 82 as described in relation to FIG. 6.

Figure 8:
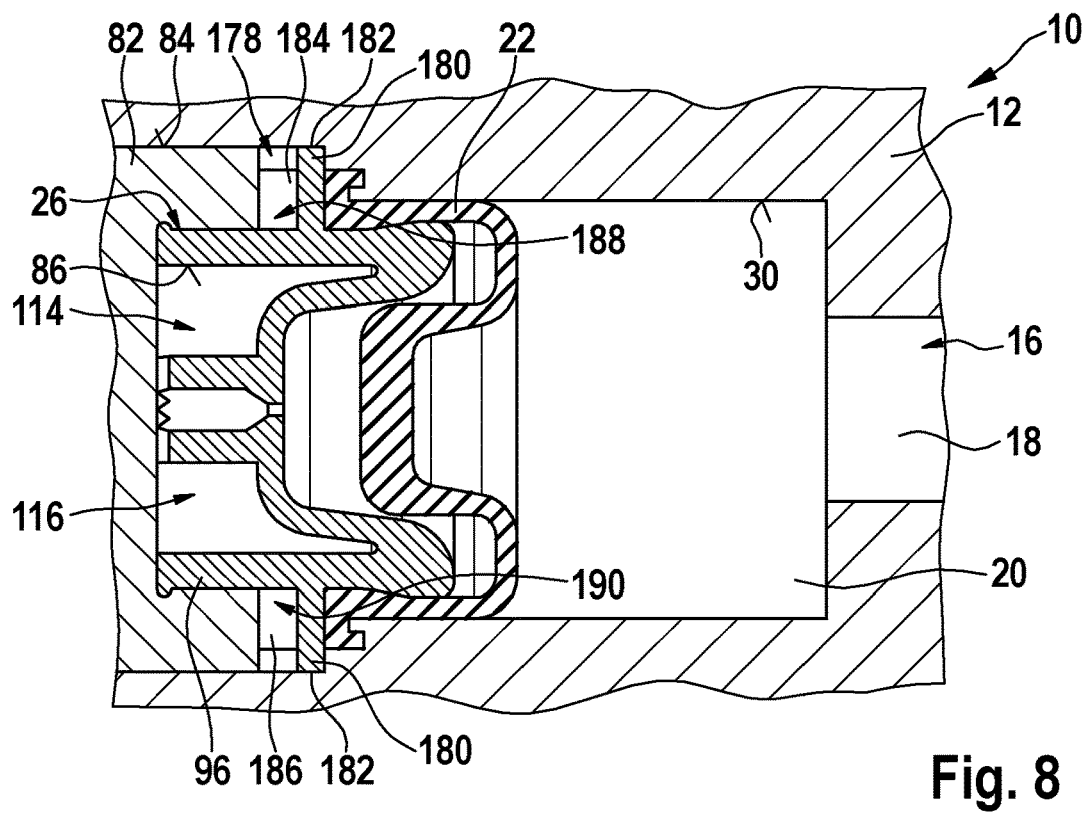
FIG. 8 shows a third exemplary embodiment of a brake system damping device according to the disclosure.

FIG. 8 shows a brake system damping device 10 which differs from that in FIG. 6 in the configuration of the component 82 and of the second separating element 26. It is thus also the case here that no hydraulic pressure 18 is applied to the first chamber 20 by means of the supply line 16. As a departure from FIG. 6, here in FIG. 8 the component 82 does not reach, with its component outer wall 84 and component inner wall 86, up to the first separating element 22. There is thus formed a fourth chamber 178 which runs around the second separating element 26 or its rib casing 96. The second separating element 26 here has a support ring 180 which runs around the rib casing 96 and is configured in one piece therewith. The support ring 180 has a ring outer edge 182 and projects into the fourth chamber 178 in such a way that it bears against the first separating element 22, and additionally terminates with the ring outer edge 182 on the housing 12 or the housing inner wall 30. The fourth chamber 178 is thus surrounded or formed by the housing 12, the component 82 and the second separating element 26, or the rib casing 96 and the support ring 180 of the second separating element 26.

The fourth chamber 178 is divided by means of a plurality of ring ribs, of which here only the two ring ribs 184 and 186 are illustrated, into a plurality of ring subchambers, of which here only the ring subchambers 188 and 190 are illustrated. In this case, the ring subchambers 188, 190 are connected to the structure subchambers 114, 116 in a medium-conducting manner by means of the casing slots 154, 156, 166, 168, which are illustrated only in FIGS. 7 and 9. All further components and details in FIG. 8 correspond to those in FIG. 6 and will not be listed again here.

The brake system damping device 10 illustrated here is comparable in its basic mode of operation to the brake system damping device 10 in FIG. 6. However, the component 82 no longer bears here in a stabilizing manner against the first separating element 22. This task is taken over here by the support ring 180 of the second separating element 26. The fourth chamber 178 resulting on account of the smaller or shorter component 82 is now available as additional volume, with the result that a still higher degree of damping of the brake system damping device 10 is achieved. By virtue of the division of the fourth chamber 178 into a plurality of ring subchambers 188, 190, the degree of damping can also be graduated here. In addition, the ring ribs 184, 186 dividing the fourth chamber 178 support the support ring 180 against the component 82.

Figure 9:
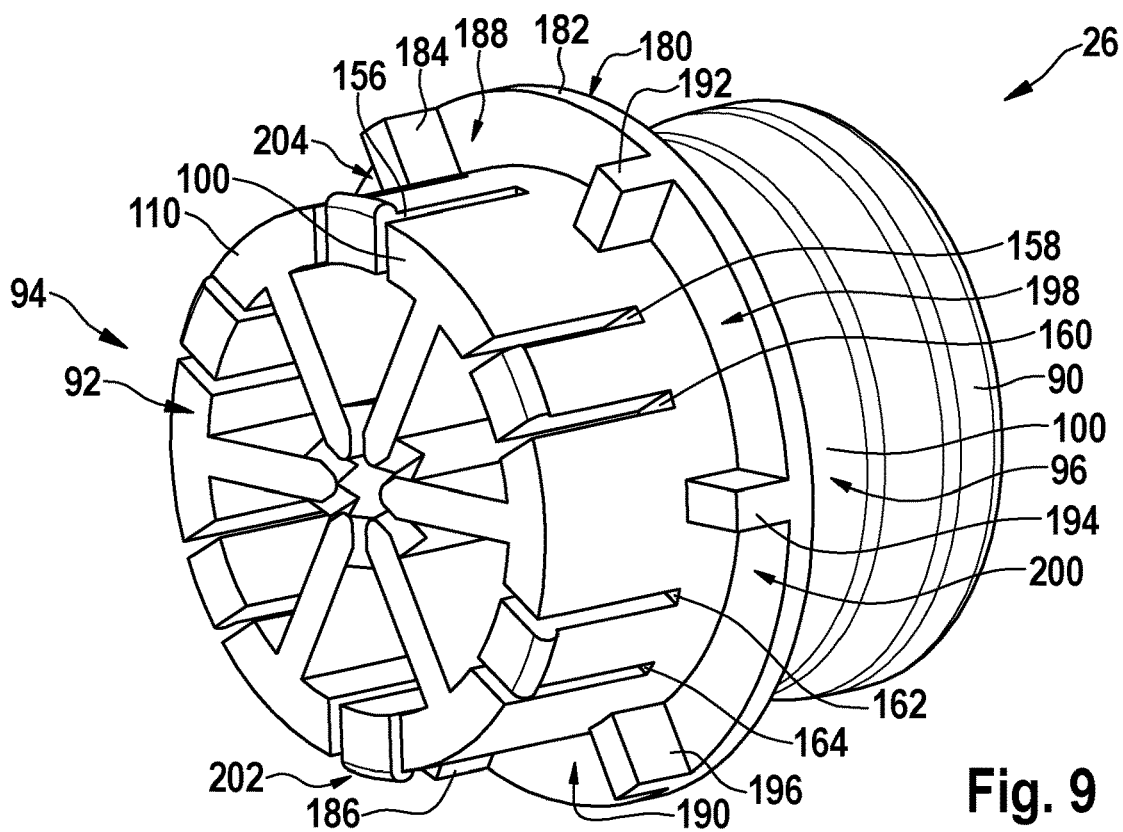
FIG. 9 shows the detail IX from FIG. 8.

FIG. 9 illustrates the second separating element 26 from FIG. 8 in perspective. The outer convexity 90 and the casing outer wall 100 of the rib casing 96 are also clearly visible again. The focus in FIG. 9 is in particular on the support ring 180 with its ring outer edge 182 and on the ring ribs arranged on the support ring 180, of which here, in addition to the ring ribs 184 and 186, further ring ribs 192, 194, 196 are illustrated. The rib structure 92 at the structure end side 94 is not clearly visible in the perspective illustrated here, but corresponds to the rib structure 92 in FIG. 7. Clearly visible are the casing slots 156, 158, 160, 162 and 164 in the rib casing 96 that extend from the structure end side 94 in the direction of the support ring 180. The support ring 180 and the ring ribs 184, 186, 192, 194, 196 are arranged on the casing outer wall 100 in such a way that the casing slots 156, 158, 160, 162, 164 reach up closer to the support ring 180 than the ring ribs 184, 186, 192, 194, 196 project from said support ring. It is only thus that ring subchambers, of which here, in addition to the ring subchambers 188 and 190, also further ring subchambers 198, 200, 202, 204 are indicated, are connected in a medium-conducting manner to the structure subchambers 114, 116, 134, 136, 138, 140, which are illustrated only in FIG. 7.

The components which are newly illustrated here and which match those illustrated in FIG. 8 in terms of nomenclature, such as for example the further ring ribs 192, 194, 196, also have the same function. Therefore, such components will not be explained again in terms of their function. Here again newly visible, and therefore not yet described in terms of their functionality in FIG. 8, are the casing slots 154, 156, 158, 160, 162, 164. The remaining casing slots 166, 168, 170, 172, 174, 176 illustrated in FIG. 7 are not illustrated for this embodiment. However, since the second separating element 26 is designed to be symmetrical, an overall picture can be inferred from the visibly illustrated components. Moreover, it can be inferred from FIG. 8 and FIG. 9 in combination how the ring subchambers 188, 190, 198, 200, 202, 204 are connected by means of the casing slots 154, 156, 158, 160, 162, 164 to the ring structure 92 within the rib casing 96.

The invention claimed is:

1. A brake system damping device comprising:
a first chamber, to which hydraulic pressure is applied;
a second chamber, in which a compressible medium is situated;
a first separating element separating the first chamber from the second chamber;
a third chamber, in which the compressible medium is situated;
a second separating element separating the second chamber from the third chamber, the second separating element defining at least one passage that connects the second chamber to the third chamber in a medium-conducting manner;
a closure element that moves together with the first separating element and is configured to close the passage as soon as the hydraulic pressure in the first chamber reaches a predefined pressure value; and
a rib structure having at least one structure rib, which supports the second separating element and extends along an entire axial length of the third chamber, the at least one structure rib circumferentially separating a plurality of subchambers of the third chamber from one another.

2. The brake system damping device as claimed in claim 1, wherein the first separating element is formed in one piece with the closure element.

3. The brake system damping device as claimed in claim 1, wherein the first separating element includes a diaphragm.

4. The brake system damping device as claimed in claim 1, wherein the first separating element is formed of an elastomer.

5. The brake system damping device as claimed in claim 1, wherein the predefined pressure value is between 0 and 30 bar.

6. The brake system damping device as claimed in claim 1, wherein the at least one passage is defined by an open-pore material.

7. The brake system damping device as claimed in claim 1, wherein the at least one passage includes a plurality of passages defined in the second separating element.

8. The brake system damping device as claimed in claim 1, wherein each subchamber of the plurality of subchambers is connected to the second chamber in a medium-conducting manner by a respective passage of the at least one passage.

9. The brake system damping device as claimed in claim 1, wherein the third chamber is defined by the second separating element and a cover.

10. The brake system damping device as claimed in claim 9, wherein the second separating element is completely enclosed by the cover and the first separating element.

11. The brake system damping device as claimed in claim 1, wherein the rib structure defines at least one connecting duct that connects adjacent subchambers of the plurality of subchambers to one another in a medium-conducting manner.

12. The brake system damping device as claimed in claim 1, wherein the rib structure further comprises a rib casing surrounding the at least one structure rib.

13. The brake system damping device as claimed in claim 12, wherein the rib casing defines at least one casing slot extending between a respective subchamber of the plurality of subchambers and a cover that at least partially surrounds the second separating element.

14. The brake system damping device as claimed in claim 12, wherein the rib casing includes at least one latching element.

15. The brake system damping device as claimed in claim 3, wherein the diaphragm is a rolling diaphragm.

16. The brake system damping device as claimed in claim 4, wherein the first separating element is formed of ethylene-propylene-diene rubber.

17. The brake system damping device as claimed in claim 1, wherein the predefined pressure value is between 3 and 10 bar.

18. The brake system damping device as claimed in claim 1, wherein the predefined pressure value is 5 bar.

19. The brake system damping device as claimed in claim 14, wherein the at least one latching element protrudes from an outer wall of the rib casing and is arranged at an end side of the rib structure.

* * * * *